US012552277B2

(12) United States Patent
Perumalla et al.

(10) Patent No.: US 12,552,277 B2
(45) Date of Patent: Feb. 17, 2026

(54) FLYING CHARGING STATION FOR TRANSPORTING UNMANNED AERIAL VEHICLES (UAVs)

(71) Applicant: INTERNATIONAL BUSINESS MACHINES CORPORATION, Armonk, NY (US)

(72) Inventors: Saraswathi Sailaja Perumalla, Visakhapatnam (IN); Sarbajit K. Rakshit, Kolkata (IN); Akash U. Dhoot, Pune (IN); Bhavya Pochiraju, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 17/934,222

(22) Filed: Sep. 22, 2022

(65) Prior Publication Data

US 2024/0100980 A1    Mar. 28, 2024

(51) Int. Cl.
*B60L 53/31*   (2019.01)
*B60L 53/16*   (2019.01)
*B60L 53/30*   (2019.01)

(52) U.S. Cl.
CPC ............... *B60L 53/31* (2019.02); *B60L 53/16* (2019.02); *B60L 53/305* (2019.02)

(58) Field of Classification Search
CPC ......... B60L 53/31; B60L 53/305; B60L 53/16
USPC ........................................................ 320/109
See application file for complete search history.

(56) References Cited

U.S. PATENT DOCUMENTS

| 8,511,606 | B1* | 8/2013 | Lutke | B64U 80/40 |
| | | | | 320/109 |
| 8,899,903 | B1* | 12/2014 | Saad | B65G 67/00 |
| | | | | 320/109 |
| 9,421,869 | B1* | 8/2016 | Ananthanarayanan | ...... |
| | | | | B60L 5/005 |
| 10,099,561 | B1* | 10/2018 | Ananthanarayanan | ...... |
| | | | | B60L 53/126 |
| 2020/0040598 | A1* | 2/2020 | Evans | B60L 53/53 |
| 2020/0281138 | A1 | 9/2020 | Chen | |
| 2022/0194579 | A1* | 6/2022 | Kelly | B64U 50/32 |
| 2022/0281597 | A1* | 9/2022 | Tian | B64C 37/00 |
| 2023/0058405 | A1* | 2/2023 | Chen | G08G 5/30 |

(Continued)

OTHER PUBLICATIONS

Birk, A. "Autonomous Recharging of Mobile Robots", Draft Version (paper # 97RO029) accepted at ISATA'97, Florence, 1997, 8 pgs.

(Continued)

*Primary Examiner* — Suchin Parihar
(74) *Attorney, Agent, or Firm* — Elliot J. Shine

(57) ABSTRACT

A mobile charging station for transporting and recharging multiple UAVs (unmanned aerial vehicles), typically small UAVs, with the charging station, itself, being in the form of a carrier UAV. By transporting smaller passenger UAVs in, or on, the larger carrier UAV: (i) the smaller UAVs effectively have a longer range because they can be taken part, or even most, of the way to a target destination by riding in, or on, the larger carrier UAV; (ii) the passenger UAVs can have their electrical batteries re-charged; (ii) the passenger UAVs can have their batteries replaced; and/or (iv) the passenger UAVs can have their hydrogen fuel cells recharged with hydrogen (for examples, by replacement of the fuel cell or by pumping hydrogen into the existing fuel cell.

12 Claims, 4 Drawing Sheets

(56) References Cited

U.S. PATENT DOCUMENTS

| | | | |
|---|---|---|---|
| 2023/0106432 A1* | 4/2023 | Baumgartner | G05D 1/221 |
| | | | 701/2 |
| 2024/0070602 A1* | 2/2024 | Cui | B60L 53/68 |
| 2024/0123843 A1* | 4/2024 | Rakshit | B60L 53/66 |

OTHER PUBLICATIONS

Fadelli, I., "RoboFly: An Insect-Sized Robot That Can Fly, Walk and Drift on Water Surfaces", Tech Xplore, Jan. 29, 2020, 2 pgs., <https://techxplore.com/news/2020-01-robofly-insect-sized-robot-drift-surfaces.html>.

Kadioglu, et al., "A Method for Transporting a Team of Miniature Robots", Conference: Intelligent Robots and Systems, 2003. (IROS 2003). Proceedings. 2003 IEEE/RSJ International Conference on, vol. 3, IEEE Xplore, vol. 3, Nov. 2003, 6 pgs., DOI:10.1109/IROS.2003.1249213.

Mehar, P., "U.S. Military Plans to Develop an Autonomous Drone Charging Station", Emerging Tech, Oct. 11, 2020, 3 pgs., <https://www.inceptivemind.com/us-military-plans-develop-autonomous-drone-charging-station/15672/>.

Mei, et al., "Deployment of Mobile Robots with Energy and Timing Constraints", IEEE Transactions on Robotics, vol. 22, No. 3, Jun. 2006, 16 pgs.

Okunevich, et al., "MobileCharger: An Autonomous Mobile Robot with Inverted Delta Actuator for Robust and Safe Robot Charging", Jul. 23, 2021, © 2021 IEEE, 8 pgs., arXiv:2107.10585v2 [cs.RO].

* cited by examiner

FLYING CHARGING STATION FOR TRANSPORTING UNMANNED AERIAL VEHICLES (UAVs)

BACKGROUND

The present invention relates generally to the field of providing battery charging for unmanned aerial vehicles and more particularly to charging of UAVs that are powered into flight by the flapping of wing structures.

The Wikipedia entry for "Unmanned Aerial Vehicle" (as of Mar. 31, 2022) states, in part, as follows: "An unmanned aerial vehicle (UAV) . . . is an aircraft without any human pilot, crew, or passengers on board. UAVs are a component of an unmanned aircraft system (UAS), which includes adding a ground-based controller and a system of communications with the UAV. The flight of UAVs may operate under remote control by a human operator, as remotely-piloted aircraft (RPA), or with various degrees of autonomy, such as autopilot assistance, up to fully autonomous aircraft that have no provision for human intervention . . . . Based on their weight, [UAVs] can be classified into five categories—nano (weighing up to 250 g), Micro air vehicles (MAV) (250 g-2 kg), Miniature UAV or small (SUAV) (2-25 kg), medium (25-150 kg), and large (over 150 kg) . . . . Small [UAVs] mostly use lithium-polymer batteries (Li-Po), while some larger vehicles have adopted a hydrogen fuel cell. The energy density of modern Li-Po batteries is far less than gasoline or hydrogen . . . . Ornithopters—wing propulsion[.] Flapping-wing ornithopters, imitating birds or insects, have been flown as microUAVs . . . . Full autonomy is available for specific tasks, such as airborne refueling or ground-based battery switching . . . . Other functions available or under development include[:] collective flight . . . simultaneous localization and mapping and swarming . . . and machine learning . . . . Micro air vehicles endurance is so far best achieved with flapping-wing UAVs, followed by planes and multirotors standing last, due to lower Reynolds number . . . . Swarm resilience involves maintaining operational capabilities and reconfiguring tasks given unit failures." (footnote(s) omitted)

The Wikipedia entry for "Micro Air Vehicle (MAV)" (as of Aug. 24, 2022) states, in part, as follows: "A micro air vehicle (MAV), or micro aerial vehicle, is a class of miniature UAVs that has a size restriction and may be autonomous. Modern craft can be as small as 5 centimeters . . . . The small craft allows remote observation of hazardous environments inaccessible to ground vehicles . . . . A new trend in the MAV community is to take inspiration from flying insects or birds to achieve unprecedented flight capabilities." (footnote(s) omitted)

Flapping-wing ornithopters (FWOs) have numerous useful applications. For instance, aiding search and rescue (SAR) missions, simplifying the inspection of infrastructures and speeding up agricultural processes. RoboFly is a flapping-wing micro-robot inspired by flying insects. These insects can fly, walk, and some of them can also skim on the surface of water. Some embodiments are directed to a robot that mimics its biological counterpart by performing multimodal locomotion which includes aerial, ground, and water surface locomotion. One currently conventional technology is a ground-based, stationary autonomous charging system that can support a swarm of hundreds of unmanned air vehicles.

SUMMARY

According to an aspect of the present invention, a mobile unmanned aerial vehicle (UAV) charging station is used with a plurality of passenger UAVs with each passenger UAV including a passenger UAV battery. The mobile UAV charging station includes: a UAV frame; a UAV propulsion system; a UAV control system; a mobile charging battery; and a plurality of charging ports and associated circuitry. The UAV propulsion system is structured and configured so that the mobile UAV charging station can fly under control of the UAV control system; the UAV frame is sufficient large that it can support and transport the plurality of passenger UAVs. The plurality of charging ports and associated circuitry are structured, located and configured so that each charging port is electrically connectable to a passenger UAV to recharge its passenger UAV battery from the mobile charging battery.

According to a further aspect of the present invention, a mobile unmanned aerial vehicle (UAV) charging station is used with with a plurality of passenger UAVs with each passenger UAV including a replaceable passenger UAV battery. The mobile UAV charging station includes: a UAV frame; a UAV propulsion system; a UAV control system; a plurality of replacement batteries; a plurality of ports; and a battery replacement system. The UAV propulsion system is structured and configured so that the mobile UAV charging station can fly under control of the UAV control system. The UAV frame is sufficient large that it can support and transport the plurality of passenger UAV that are respectively docked to the plurality of ports. The ports and battery replacement system are structured, located and configured so that the battery of a passenger UAV docked at a port of the plurality of ports can be replaced by a replacement battery by the battery replacement system.

According to a further aspect of the present invention, a mobile unmanned aerial vehicle (UAV) charging station is used with a plurality of passenger UAVs with each passenger UAV including a hydrogen fuel cell. The mobile UAV charging station includes: a UAV frame; a UAV propulsion system; a UAV control system; a plurality of ports; and hydrogen fuel cell recharging system. The UAV propulsion system is structured and configured so that the mobile UAV charging station can fly under control of the UAV control system. The UAV frame is sufficient large that it can support and transport the plurality of passenger UAVs that are respectively docked to the plurality of ports. The ports and hydrogen fuel cell recharging system are structured, located and configured so that the hydrogen fuel cell of a passenger UAV docked at a port of the plurality of ports can be recharged by the hydrogen fuel cell recharging system.

DETAILED DESCRIPTION

Figure 1:
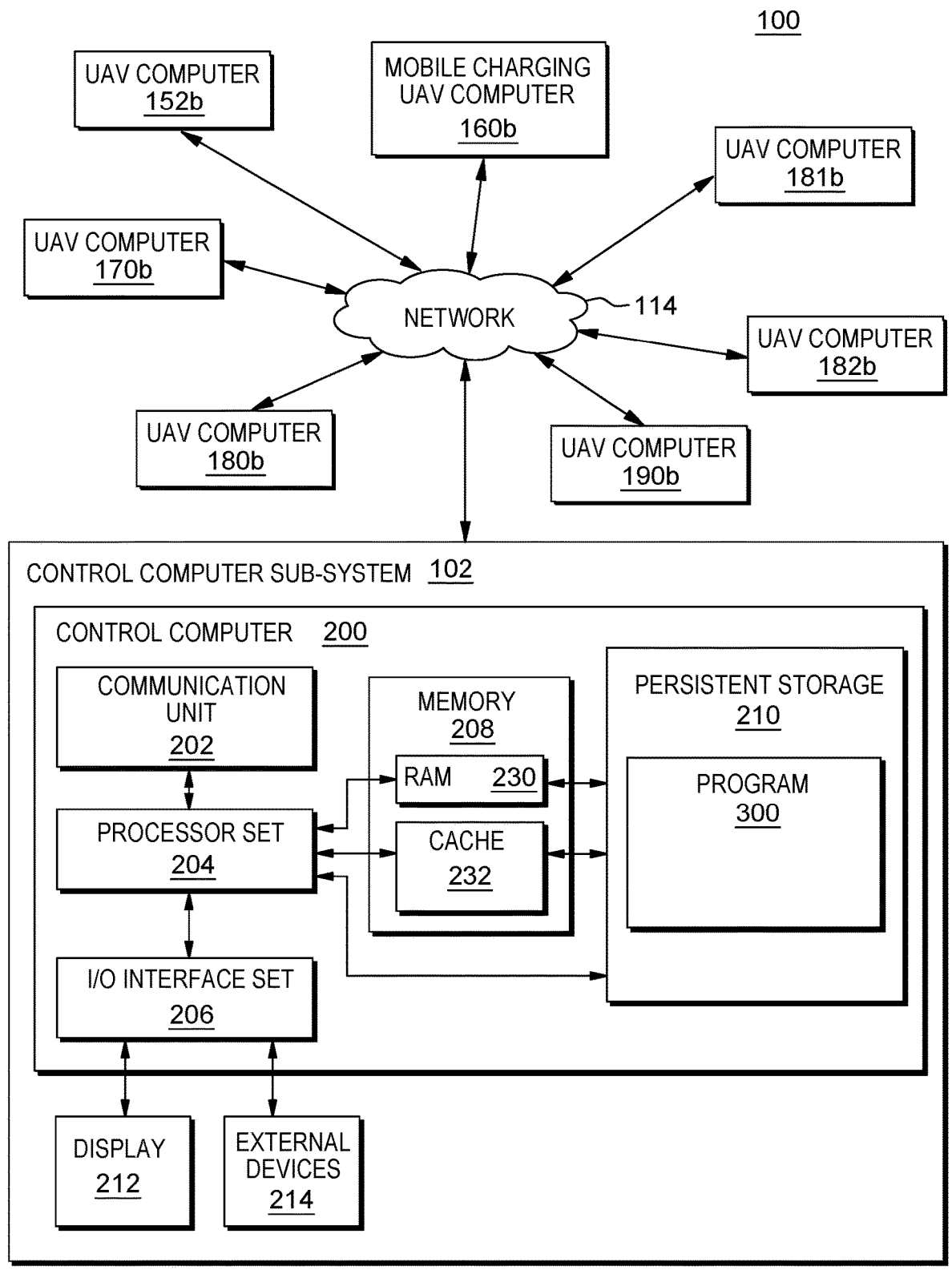
FIG. 1 is a block diagram view of a first embodiment of a system according to the present invention.

Some embodiments of the present invention are directed to a mobile charging station for transporting and recharging multiple UAVs (unmanned aerial vehicles), typically small UAVs, with the charging station, itself, being in the form of a carrier UAV. By transporting smaller passenger UAVs in, or on, the larger carrier UAV: (i) the smaller UAVs effectively have a longer range because they can be taken part, or even most, of the way to a target destination by riding in, or on, the larger carrier UAV; (ii) the passenger UAVs can have their electrical batteries re-charged; (ii) the passenger UAVs can have their batteries replaced; and/or (iv) the passenger UAVs can have their hydrogen fuel cells recharged with hydrogen (for examples, by replacement of the fuel cell or by pumping hydrogen into the existing fuel cell.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
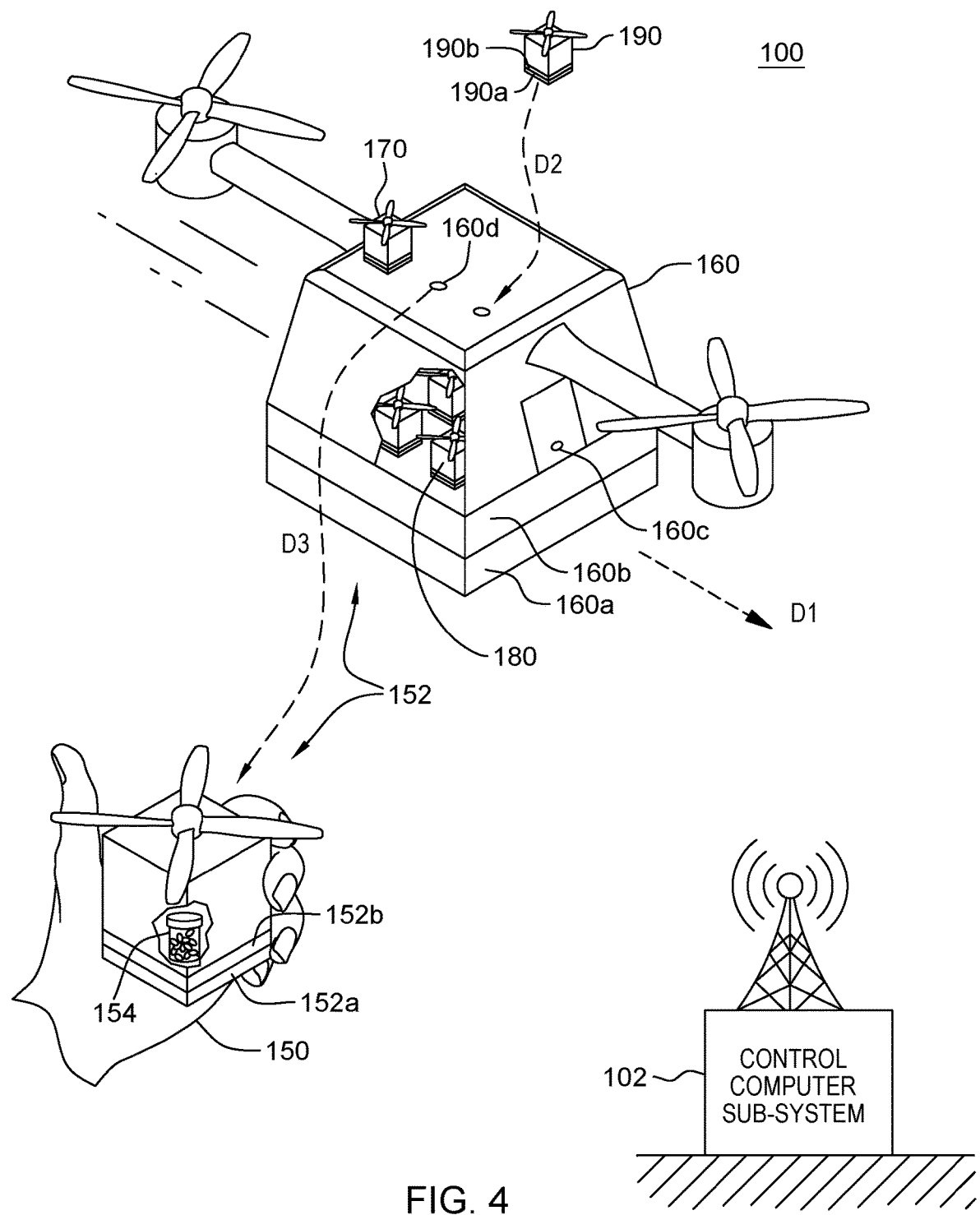
FIG. 4 is a block diagram showing additional components of the first embodiment system.
Figure 5:
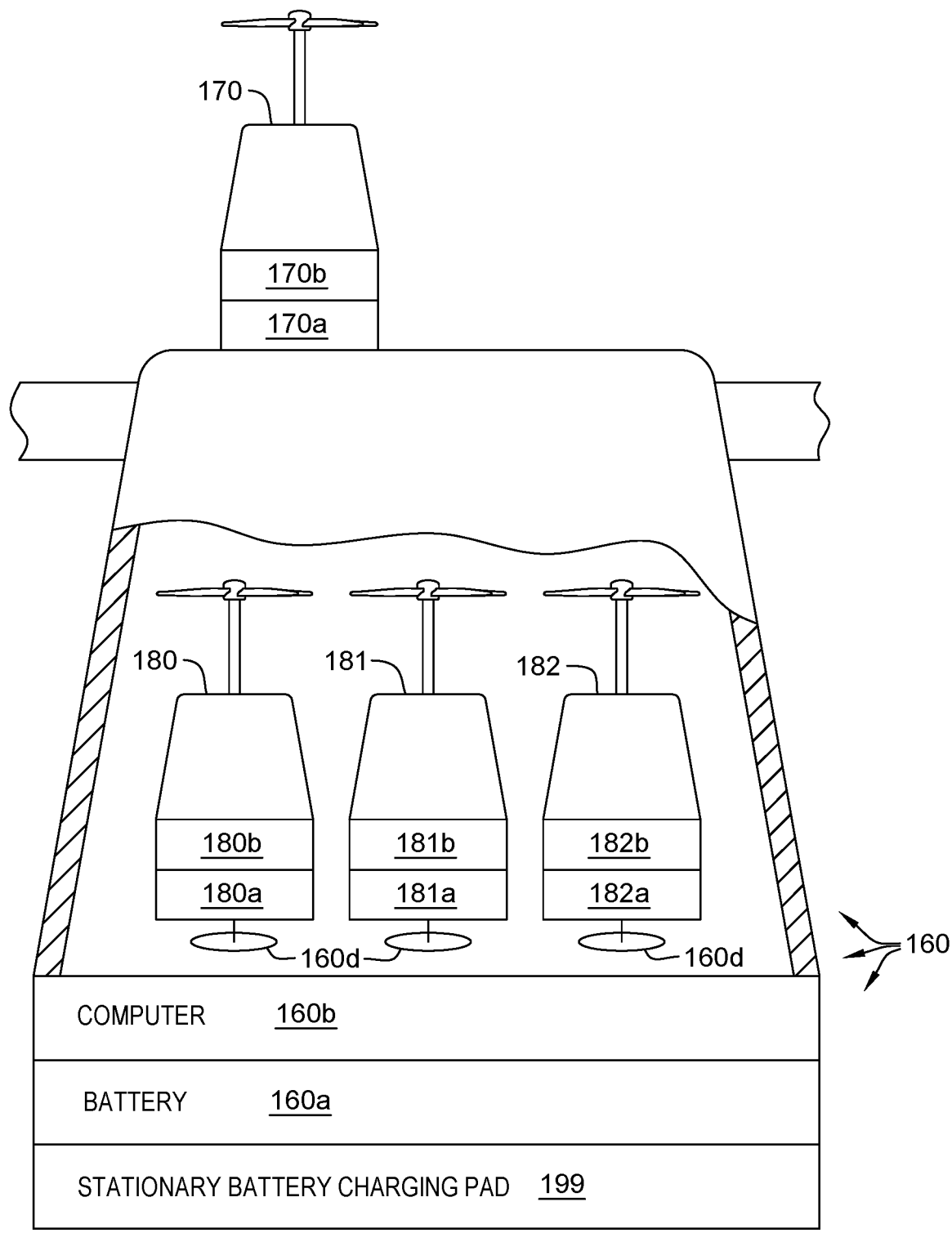
FIG. 5 is a block diagram showing additional components of the first embodiment system.

As shown in FIGS. 1, 4 and 5 (taken together) networked computers system 100 is an embodiment of a hardware and software environment for use with various embodiments of the present invention. Networked computers system 100 includes: control computer subsystem 102 (sometimes herein referred to, more simply, as subsystem 102); first user 150; first passenger UAV 152 (including battery 152a, computer 152b and payload 154); mobile charging UAV 160 (including battery 160a, computer 160b, sliding door 160c and charging ports 160d); second passenger UAV 170 (including battery 170a and computer 170b); fourth passenger UAV 180 (including battery 180a and computer 180b); fifth passenger UAV 181(including battery 181a and computer 181b); sixth passenger UAV 182 (including battery 182a and computer 182b); seventh passenger UAV 190 (including battery 190a and computer 190b); communication network 114; and stationary charging pad 199. Control computer subsystem 102 includes: control computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
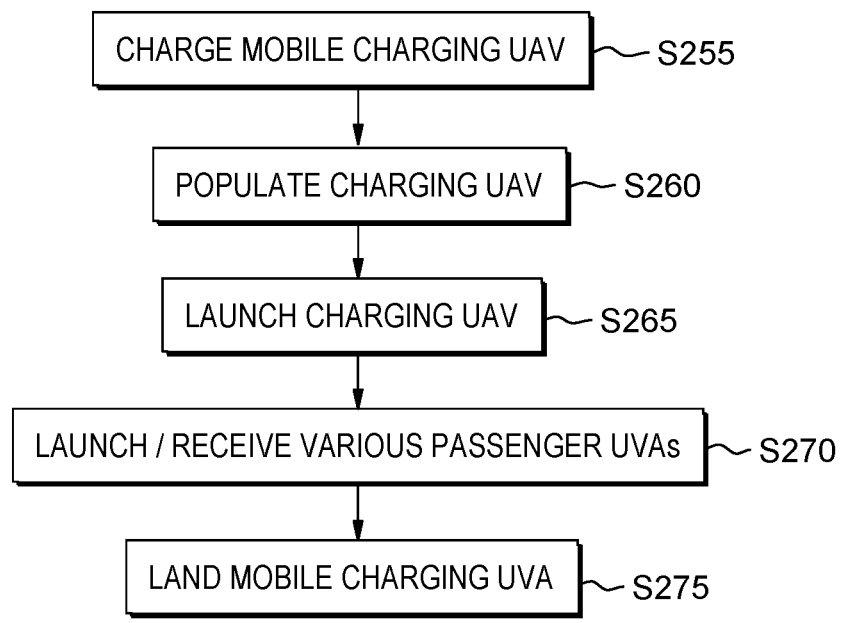
FIG. 2 is a flowchart showing a first embodiment method performed, at least in part, by the first embodiment system.
Figure 3:
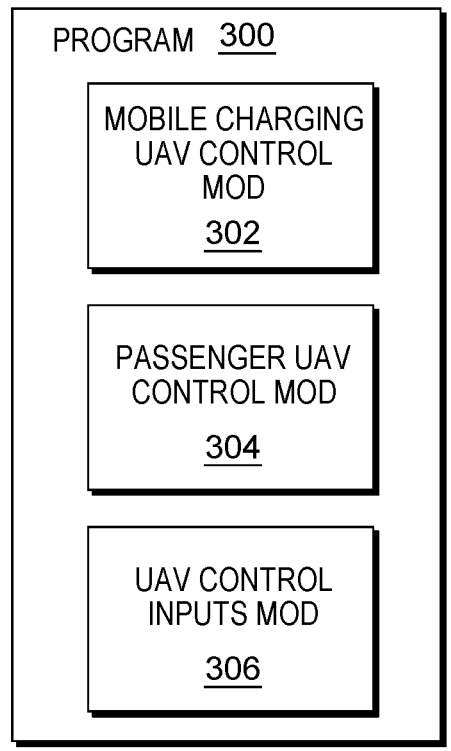
FIG. 3 is a block diagram showing a machine logic (for example, software) portion of the first embodiment system.

As shown in FIGS. 1, 4 and 5 (taken together), networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1 to 5.

Processing begins at operation S255, where mobile charging UAV control module ("mod") 302 controls mobile charging UAV 160 to recharge its lithium ion battery 160a. More specifically, and as shown in FIG. 5, mod 302 controls mobile charging UAV to land on and dock with stationary battery charging pad 199. In this embodiment, mobile charging UAV 160 is completely controlled by computer. Alternatively or additionally, mobile charging UAV may be controlled by a human operator who is remote from mobile charging UAV 160. In this embodiment, the mobile charging UAV is powered by a battery and actuated into flight by a propeller. Alternatively or additionally, the mobile charging UAV may be powered by combustion of fuel, a hydrogen fuel cell or any other suitable energy source now known or to be developed in the future. Alternatively or additionally, the mobile charging UAV may have other types of propulsion hardware, such as a jet engine that uses compressed air. It may be possible, at least in theory, to have the propulsion hardware take the form of flapping wings, but, because mobile charging UAV is relatively large, this may, or may not be practical.

Processing proceeds to operation S260, where passenger UAV control mod 304 controls population of mobile charging UAV 160 by passenger UAVs, with the populating including, in this example: (i) second passenger UAV controlled to land on and dock with the upward facing major exterior surface at one of the charging ports 160d; and (ii) third, fourth and fifth passenger UAVs are controlled to fly through sliding door 160c and the interior space of the mobile charging UAV 160 and to land on an dock with charging ports 160d. this embodiment has nine (9) charging ports, three on the exterior surface and six (6) charging ports in the interior space. Some embodiments of the present invention will have space and/or charging ports for many more passenger UAVs.

In this embodiment, the batteries of the various passenger UAVs 150a, 170a, 180a, 181a, 182a and 190a are all lithium ion batteries and they can be electrically recharged through ports on the mobile charging UAV. One variation is that the mobile charging station may be structured and configured to change batteries in the passenger UAVs, exchanging used up batteries for fresh, fully charged batteries. As another possible variation, the passenger UAVs may have hydrogen fuel cells, and the mobile charging UAV is equipped to refresh the hydrogen fuel cell by either replacing the hydrogen fuel cell or by adding hydrogen to the hydrogen fuel cell.

Processing proceeds to operation S265, where mobile charging UAV control mod launches the mobile charging UAV. The mobile charging UAV is shown flying through the sky in FIG. 4. In this example, a remote area is having a vitamin deficiency, so the plan is for the mobile charging UAV to fly in a holding pattern around the area (see flight path D1 in FIG. 4), while the passenger UAVs deliver vials of vitamins to all the households in the remote area. The holding pattern and the locations of the households in the remote area are determined and/or received by UAV control inputs mod 306.

Processing proceeds to operation S270 where mobile charging UAV 160 transports passenger UAVs 150, 170, 180, 181, 182 and 190 to and through the remote area suffering the vitamin deficiency. As shown in FIG. 4: (i) passenger UAV 150 is dispatched by passenger UAV control mod 304 along flight path D3 to deliver payload 154 (vitamins in this example) to first user 150; and (ii) passenger UAV 190 is returned, under instruction of passenger UAV control mod 304, along flight path D2 to one of the charging ports 160d of mobile charging 160 after having delivered some anti-venom to the makeshift hospital at the westernmost edge of the remote area.

After all of the vitamins and anti-venom has been delivered, at operation S275, mobile charging UAV 160 is returned, under control of mod 302, to stationary battery charging pad 199 to recharge, re-populate with loaded passenger UAVs and await the next delivery assignment.

III. Further Comments and/or Embodiments

A beehive is an enclosed structure in which some honeybee species of the subgenus Apis live and raise their young. Though the word beehive is commonly used to describe the nest of any bee colony, scientific and professional literature distinguishes nest from hive.

Flapping-wing ornithopters (FWOs) may be deployed in a localized area where, because of limited size and dimension of the FWOs, they have limited battery power. It can be hard for the FWOs to travel long distances to perform activities. In many cases, travelling is a non-value-added activity for FWOs. Thus, there is a need to find a method and system by which the FWOs can reduce the non-value-added activities and increase value-added activities.

Some embodiments of the present invention may include one, or more, of the following operations, features, characteristics and/or advantages: (i) a mobile charging UAV will carry, or have integrally built into it, a beehive like shelter for the FWOs; (ii) the mobile charging UAV will carry a set of FWOs on the beehive shelter and will be deploying the FWOs where required: (iii) based on the contextual need of the activities, the required number of FWOs will be deployed from the beehive shelter of the mobile UAV charging station; (iv) the mobile UAV charging station will analyze the contextual need and will programmatically deploy the required number of FWOs in different locations; (v) based on weather conditions (such as wind, rain, etc.), the FWOs will leave the activity area and will be attaching themselves with the beehive like shelter in the mobile UAV charging station; (vi) the mobile UAV charging stations will ensure the shelter of the FWOs; (vii) in the beehive shelter, the FWOs will be coupled with each in multiple layers; and/or (viii) the size of the beehive shelter will be increased and will be carried by the mobile UAV charging station.

Some embodiments of the present invention may include one, or more, of the following operations, features, characteristics and/or advantages: (i) based on the power requirement with the FWOs, and the location on the FWOs around the activity area, the mobile UAV charging station will dynamically arrive around the location of the FWOs so that the FWOs can attach with be beehive shelter for recharging; (ii) the system will analyze the required number of FWOs in the activity area, and when a set of FWO(s) moves to the beehive shelter for recharging, then another set of stored FWOs will be deployed from the mobile UAV charging station to compensate for the number of FWOs moved out for recharging; (iii) the system will assess the current power capacity and activity that an FWO is going to perform; and/or (iv) based on the previous item, the mobile UAV charging station will set the return event for the FWOs.

Some embodiments of the present invention may include one, or more, of the following operations, features, characteristics and/or advantages: (i) the mobile UAV charging station (sometimes working co-operatively with computers at a stationary headquarters) also orchestrates the flow of activity, where it pre-states or configures the backup FWOs to continue performing the activities left in by the current performing FWO that had to return for charging; (ii) while the FWOs return to the mobile UAV charging station for charging, they share the last state of performed activity which can be further leveraged by the mobile UAV charging station to select which FWO can be perform the remaining activity based on power requirement to perform the remaining activity; and/or (iii) when the mobile UAV charging station moves to another location/area or surrounding area to help in supplying power to needed FWOs, the mobile UAV charging station, before leaving the prior location/area, assesses the need of previous deployed FWOs and makes sure until the mobile UAV charging station returns and are functioning.

Some embodiments of the present invention may include one, or more, of the following operations, features, characteristics and/or advantages: (i) while the FWOs are returning for power charging, the mobile UAV charging stations enable the magnetic effect to pull the FWOs, which are in at lower power or are already dead on the ground, to the mobile UAV charging stations where the mobile UAV charging stations will catch and reactivate them; (ii) the system predicts the remaining part of the activities by FWOs and the need for additional power; (iii) the mobile UAV charging stations will identify if the FWOs need to return for power-charging; and/or (iv) the system determines if other FWOs need to be deployed due to substantial work remaining, or if using WPT (wireless power transfer) on the current FWOs will suffice.

Some embodiments of the present invention may include one, or more, of the following operations, features, characteristics and/or advantages: (i) the system identifies the need for WPT; (ii) the system can enabled the WPT channel with FWOs and transmit the needed power which is required to complete any remaining activity; (iii) the system supports the WPT sharing model between FWOs which supply the power to peer FWOs which are available in the surrounding area; and/or (iv) once the FWO have completed their assigned task, they return back to the mobile UAV charging station where they transmit the remaining power to other near-by FWOs.

Some embodiments of the present invention may include one, or more, of the following operations, features, characteristics and/or advantages: (i) the mobile UAV charging station hosts the beehive shelter for the FWOs; (ii) based on the analysis of the activity surrounding, the mobile UAV charging station will deploy the required number of FWOs around the activity area; (iii) the mobile UAV charging station and FWOs are enabled for wireless power transmission; and/or (iv) based on the need, instead of the FWOs returning back to mobile UAV charging station for power charging, the mobile UAV charging station or peer FWO supplies the needed power to the other FWO.

Some embodiments of the present invention may include one, or more, of the following operations, features, characteristics and/or advantages: (i) the FWO can be used for pollination; (ii) the mobile UAV charging station has a beehive type shelter for FWOs; (iii) the mobile UAV charging station analyzes the activity surround the beehive; (iv) the system deploys the required number of FWOs that need to be deployed to perform the required activity; (v) the mobile UAV charging station is enabled with WPT; (vi) the mobile UAV charging station transmits WPT signals to FWOs when needed; and/or (vii) one FWO has the ability to transmit WPT signals to another FWO while returning to the beehive.

A method according to an embodiment of the present invention includes the following operations (not necessarily in the following order): (i) includes a shelter for FWOs on a mobile UAV charging station system, where the mobile UAV charging station can be a UAV; (ii) uses an FWO for various activities in any surrounding; (iii) the activities for FWOs can be for artificial pollination, investigation of any surrounding, etc.; (iv) the FWOs have an auto-collapsing mechanism and have a coupling mechanism between each other; (v) the second UAV will have various scanning modules to identify the contextual scenario in the activity surroundings; (vi) the contextual scenario will identify, based on different types of sensor feed analysis, scanning analysis and identify the type and volume of the activities; and (vii) once the contextual scenario is identified by the mobile UAV charging station, the mobile UAV charging station will identify the volume of the activities.

A method according to an embodiment of the present invention includes the following operations (not necessarily in the following order): (i) based on the volume of the activity performed, the mobile UAV charging station will identify the number of FWOs required; (ii) the system will identify the duration of the activities in the surroundings so that the mobile UAV charging stations can deploy the FWOs; (iii) in any surrounding activity, there can be multiple mobile UAV charging station systems and can have a beehive shelter for each mobile UAV charging station; (iv) the mobile UAV charging station will have a storage battery to recharge the FWOs based on the need; (v) the mobile UAV charging station system will move around the surrounding activities to identify the location where the FWOs are to be deployed; (vi) the mobile UAV charging station system will deploy the required number of FWOs for the surrounding activity; (vii) once the FWOs are deployed, the FWOs will perform the activities in the surroundings; and (viii) the FWOs will communicate with the mobile UAV charging stations about the activity status, power required, etc.

A method according to an embodiment of the present invention includes the following operations (not necessarily in the following order): (i) the system will analyze the weather parameters to identify if the FWOs will have problems performing their activities; (ii) the mobile UAV charging stations will arrive around the correct place and accordingly, the FWOs will move towards the beehive shelters; (iii) the FWOs will move towards the beehive shelters and will take shelter; (iv) the FWOs will arrange like bees in the beehive shelters; (v) the FWOs will create a multiple layer of FWOs in/on the beehive shelter; (vi) the mobile UAV charging station will move towards the appropriate shelter so that the FWOs can perform the activity and can also provide required support to the FWOs; (vii) the mobile UAV charging stations and FWOs enable transmitting and accepting wireless power units; and (viii) the channel is established based on the remaining activity to be completed.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A mobile unmanned aerial vehicle (UAV) charging station comprising:
a UAV frame, wherein the UAV includes an interior defined space for a protection and transportation of a plurality of passenger UAVs;
a UAV propulsion system;
a UAV control system;
a mobile charging battery, wherein the mobile charging battery is a lithium ion battery that provides flight power to the mobile UAV charging station;
the plurality of passenger UAVs, wherein each of the plurality of passenger UAVs is a flapping-wing ornithopter (FWO) with a lithium ion battery; and
a plurality of charging ports and associated circuitry, wherein the charging ports and associated circuitry are structured, located, and configured so that each charging port is electrically connectable to recharge each passenger UAV of the plurality of passenger UAVs from the mobile charging battery;
wherein:
the UAV propulsion system is structured and configured so that the mobile UAV charging station flies under control of the UAV control system, wherein the UAV control system includes computer code instructions to perform operations comprising:
dispatching one or more passenger UAVs from one or more of the plurality of charging ports while the mobile UAV charging station is flying; and
receiving one or more passenger UAVs at one or more of the plurality of charging ports while the mobile UAV charging station is flying.

2. The mobile UAV charging station of claim 1, wherein the dispatching the one or more passenger UAVs from one or more of the plurality of charging ports, further comprises:
analyzing a contextual need of the one or more passenger UAVs for a plurality of different locations.

3. The mobile UAV charging station of claim 2, wherein the dispatching the one or more passenger UAVs from one or more of the plurality of charging ports, further comprises:
analyzing weather conditions for each of the plurality of different locations.

4. The mobile UAV charging station of claim 2, wherein the dispatching the one or more passenger UAVs from one or more of the plurality of charging ports, further comprises:
dispatching a second set of passenger UAVs from the plurality of passenger UAVs to one of the plurality of different locations, wherein a number of passenger UAVs in the second set depends on at least a number of passenger UAVs received back at the plurality of charging ports from a location and an updated contextual need for the location.

5. The mobile UAV charging station of claim 4, wherein the updated contextual need is determined at least in part based on a last state of a performed activity received from the passenger UAVs received back at the plurality of charging ports.

6. The mobile UAV charging station of claim 4, wherein the number of passenger UAVs in the second set further depends on a power requirement to perform a remaining activity at the location, which is determined at least in part based on data shared by the passenger UAVs received back at the plurality of charging ports.

7. The mobile UAV charging station of claim 1, wherein the receiving of the one or more passenger UAVs includes the mobile UAV charging station utilizing a magnetic effect to pull the one or more passenger UAVs to one or more of the plurality of charging ports.

8. The mobile UAV charging station of claim 1, further comprising:

deploying a wireless power transfer, prior to the receiving of the one or more passenger UAVs, between the one or more dispatched passenger UAVs based on a required power need and remaining activity.

9. A mobile unmanned aerial vehicle (UAV) charging station comprising:

a UAV frame, wherein the UAV includes an interior defined space for a protection and transportation of a plurality of passenger UAVs;

a UAV propulsion system;

a UAV control system;

a plurality of passenger UAVs, wherein each passenger UAV is a flapping-wing ornithopter (FWO) and includes a replaceable lithium ion UAV battery;

a plurality of replacement lithium ion batteries;

a plurality of ports; and a battery replacement system;

wherein:

the UAV propulsion system is structured and configured so that the mobile UAV charging station flies under control of the UAV control system, wherein the UAV control system includes computer code instructions to perform operations comprising:

dispatching one or more passenger UAVs from one or more of the plurality of ports while the mobile UAV charging station is flying; and receiving one or more passenger UAVs at one or more of the plurality of ports while the mobile UAV charging station is flying.

10. A mobile unmanned aerial vehicle (UAV) charging station comprising:

a UAV frame, wherein the UAV includes an interior defined space for a protection and transportation of a plurality of passenger UAVs;

a UAV propulsion system;

a UAV control system;

the plurality of passenger UAVs, wherein each of the plurality of passenger UAVs is a flapping-wing ornithopter (FWO) and includes a hydrogen fuel cell;

a plurality of ports; and hydrogen fuel cell recharging system, wherein the hydrogen fuel cell recharging system is structured, located and configured so that the hydrogen fuel cell of a passenger UAV docked at one of the plurality of ports can be recharged by the hydrogen fuel cell recharging system;

wherein:

the UAV propulsion system is structured and configured so that the mobile UAV charging station flies under control of the UAV control system, wherein the UAV control system includes computer code instructions to perform operations comprising:

dispatching one or more passenger UAVs from one or more of the plurality of ports while the mobile UAV charging station is flying; and receiving one or more passenger UAVs at one or more of the plurality of ports while the mobile UAV charging station is flying.

11. The mobile UAV charging station of claim 10 wherein the hydrogen fuel cell recharging system is structured and configured to recharge the hydrogen fuel cell by replacing the hydrogen fuel cell of a passenger UAV with a replacement hydrogen fuel cell.

12. The mobile UAV charging station of claim 10 wherein the hydrogen fuel cell recharging system is structured and configured to add hydrogen to the hydrogen fuel cell of a passenger UAV.

\* \* \* \* \*